(12) United States Patent
Li et al.

(10) Patent No.: US 9,183,119 B2
(45) Date of Patent: *Nov. 10, 2015

(54) AUTOMATICALLY ALLOCATING CLIENTS FOR SOFTWARE PROGRAM TESTING

(71) Applicant: Microsoft Technology Licensing, LLC, Redmond, WA (US)

(72) Inventors: Chunjia Li, Bellevue, WA (US); Bowen Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/318,663

(22) Filed: Jun. 29, 2014

(65) Prior Publication Data

US 2014/0317451 A1  Oct. 23, 2014

Related U.S. Application Data

(63) Continuation of application No. 13/227,939, filed on Sep. 8, 2011, now Pat. No. 8,769,340.

(51) Int. Cl.

| G06F 11/00 | (2006.01) |
|---|---|
| G06F 11/36 | (2006.01) |
| G06F 11/34 | (2006.01) |
| G06F 11/30 | (2006.01) |

(52) U.S. Cl.
CPC .......... *G06F 11/3664* (2013.01); *G06F 11/302* (2013.01); *G06F 11/3051* (2013.01); *G06F 11/3409* (2013.01); *G06F 11/3476* (2013.01); *G06F 11/3672* (2013.01); *G06F 11/3688* (2013.01); *G06F 11/3692* (2013.01)

(58) Field of Classification Search
CPC .............. G06F 11/3672; G06F 11/302; G06F 11/3051; G06F 11/3409; G06F 11/3476; G06F 11/3616; G06F 2201/865
See application file for complete search history.

(56) References Cited

U.S. PATENT DOCUMENTS

| 7,694,181 B2 | 4/2010 | Noller et al. | |
| 2006/0288256 A1* | 12/2006 | Mathew et al. | 714/38 |
| 2008/0189712 A1* | 8/2008 | Boris | 718/103 |
| 2008/0244532 A1 | 10/2008 | Arcese et al. | |
| 2009/0199047 A1 | 8/2009 | Vaitheeswaran et al. | |
| 2010/0131590 A1 | 5/2010 | Coleman et al. | |

(Continued)

OTHER PUBLICATIONS

"Non-Final Office Action Issued in U.S. Appl. No. 13/227,939", Mailed Date: Aug. 27, 2013, Filed Date: Sep. 8, 2011, 9 Pages.

(Continued)

*Primary Examiner* — Charles Ehne
(74) *Attorney, Agent, or Firm* — Brian Haslam; Kate Drakos; Micky Minhas

(57) ABSTRACT

Techniques are described herein that are capable of automatically allocating clients for testing a software program. For instance, a number of the clients that are to be allocated for the testing may be determined based on a workload that is to be imposed by the clients during execution of the testing. For example, the number of the clients may be a minimum number of the clients that is capable of accommodating the workload. In accordance with this example, the minimum number of the clients may be allocated in a targeted environment so that the test may be performed on those clients. Additional clients may be allocated along with the minimum number of the clients in the targeted environment to accommodate excess workload.

20 Claims, 7 Drawing Sheets

(56) References Cited

U.S. PATENT DOCUMENTS

2011/0010691 A1 1/2011 Lu et al.
2012/0310618 A1 12/2012 B'far et al.
2012/0311387 A1 12/2012 Santhosh et al.

OTHER PUBLICATIONS

"Notice of Allowance Issued in U.S. Appl. No. 13/227,939", Mailed Date: Feb. 19, 2014, Filed Date: Sep. 8, 2011, 5 Pages.

Moreno, Joao, "A Testing Framework for Cloud Storage Systems", A Master Thesis, Federal Institute of Technology Zurich, Department of Computer Sciences, Mar. 2010, 66 Pages.

Shah, Bharat, "Cloud Computing Testing Framework", Retrieved at http://download1325.mediafire.com/uc2e94t431yg/6x1z3x381kmz27d/Cioud+Computing+Testing+Framework.pdf, A Software Testing Conference, Nov. 22, 2010, 16 Pages.

Jayasinghe, et al., "Automated Staging Testing Framework for Amazon EC2 (Enhancing Elba in to EC2 with MySQL Cluster)", Retrieved at http://www.cc.gatech.edu/grads/i/ijayasin/resources/Deepal_Jayasinghe.pdf, Apr. 2009, 19 Pages.

Sampath, et al., "Composing a Framework to Automate Testing of Operational Web-Based Software", In Proceedings of the 20th IEEE International Conference on Software Maintenance, Sep. 11, 2004, pp. 104-113.

Thakur, Neha, "Performance Testing in Cloud: A Pragmatic Approach", Retrieved at http://WWW.diaspark.com/images/pdf/Performance-Testing-in-Cioud-A-pragmatic-approach.pdf, Mar. 23, 2011, 15 Pages.

"Azure Scalability Prescriptive Architecture using the Enzo Multitenant Framework", Retrieved at http://WWW.bluesyntax.net/files/EnzoFramework.pdf, Blue Syntax Consulting, Version 1.0.4, Published Date: Dec. 16, 2010, 16 Pages.

Kanjilal, Joydip, "Introducing Cloud Computing using the Microsoft Azure Platform", Retrieved at http://WWW.codeguru.com/csharp/net/net_general/article.php/c16947, Published Date: Mar. 8, 2010, 24 Pages.

* cited by examiner

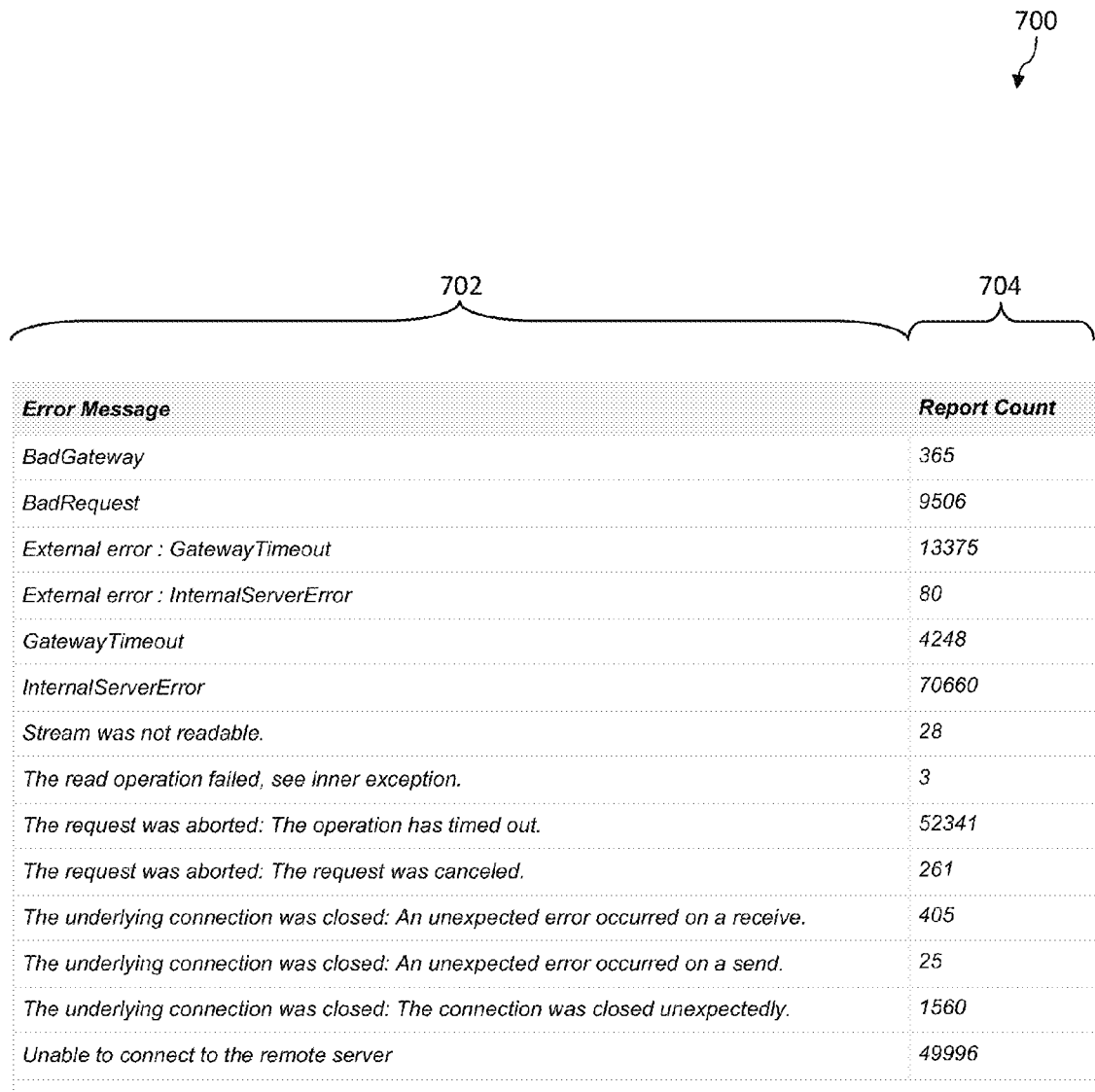

| Error Message | Report Count |
|---|---|
| BadGateway | 365 |
| BadRequest | 9506 |
| External error : GatewayTimeout | 13375 |
| External error : InternalServerError | 80 |
| GatewayTimeout | 4248 |
| InternalServerError | 70660 |
| Stream was not readable. | 28 |
| The read operation failed, see inner exception. | 3 |
| The request was aborted: The operation has timed out. | 52341 |
| The request was aborted: The request was canceled. | 261 |
| The underlying connection was closed: An unexpected error occurred on a receive. | 405 |
| The underlying connection was closed: An unexpected error occurred on a send. | 25 |
| The underlying connection was closed: The connection was closed unexpectedly. | 1560 |
| Unable to connect to the remote server | 49996 |

FIG. 7

AUTOMATICALLY ALLOCATING CLIENTS FOR SOFTWARE PROGRAM TESTING

CROSS-REFERENCE TO RELATED APPLICATION(S)

This application is a continuation of U.S. patent application Ser. No. 13/227,939, entitled "Automatically Allocating Clients for Software Program Testing," filed Sep. 8, 2011, which is incorporated herein by reference in its entirety.

BACKGROUND

Software programs traditionally are tested using a variety of tests before the software programs are sold to end users. The purpose of such tests usually is to simulate certain conditions to determine whether the software programs are capable of operating under those conditions. Each test typically is written as a stand-alone test having its own code, which is separate from the code of the other tests. In fact, different frameworks may be used for the different tests. A framework allows software having a generic functionality to be selectively changed by user code to provide application specific software. Writing and maintaining separate code and/or using different frameworks for the various tests may consume substantial time and/or resources.

Moreover, each test often specifies a predetermined fixed number of clients to be allocated for participation in the test. Restricting the number of clients in this manner hinders the use of the test for testing scenarios for which the test was not initially configured.

SUMMARY

Various approaches are described herein for, among other things, automatically allocating clients for testing a software program. For instance, a number of the clients that are to be allocated for the testing may be determined based on a workload that is to be imposed by the clients during execution of the testing. For example, the number of the clients may be a minimum number of the clients that is capable of accommodating the workload. In accordance with this example, the minimum number of the clients may be allocated in a targeted environment so that the test may be performed on those clients. Additional clients may be allocated along with the minimum number of the clients in the targeted environment to accommodate excess workload.

Some of the approaches described herein perform multi-modal testing of the software program. In accordance with these approaches, a single test is defined by code that is configurable to accommodate multiple types of test scenarios. Accordingly, the functionality of multiple types of tests may be performed using respective modes of the single test. Examples of modes include but are not limited to a functionality mode, a performance mode, a stress mode, and a scalability mode. The test in the functional mode is configured to determine whether the software program generates an expected output. The test in the performance mode is configured to determine an amount of time that the software program takes to perform an operation upon receipt of an instruction to perform the operation. The test in the stress mode is configured to determine a capability of the software program to remain operational in response to an increasing load over a period of time. The test in the scalability mode is configured to incrementally increase a workload that is associated with the test and to determine, at each incremental increase, a number of clients that are to be allocated in a targeted environment to perform operations that impose the workload against the targeted environment. Any one or more of the modes may have a predetermined configuration. A configuration of any one or more of the modes may be dynamically determined (e.g., based on characteristic(s) of the testing environment).

A method is described in which a number of clients to be allocated in a targeted environment for participation in a test of a software program is automatically determined based on a specified cumulative workload. The number of clients in the targeted environment is automatically allocated to perform operations that impose the cumulative workload against the targeted environment. Each client of the number of clients imposes a respective proportion of the cumulative load against the targeted environment. The test of the software program is executed with respect to the number of clients such that each client of the number of clients simulates use of the software program by at least one user.

A system is described that includes determination logic, allocation logic, and execution logic. The determination logic is configured to automatically determine a number of clients to be allocated in a targeted environment for participation in a test of a software program based on a specified cumulative workload. The allocation logic is configured to automatically allocate the number of clients in the targeted environment to perform operations that impose the cumulative workload against the targeted environment. Each client of the number of clients imposes a respective proportion of the cumulative load against the targeted environment. The execution logic is configured to execute the test of the software program with respect to the number of clients such that each client of the number of clients simulates use of the software program by at least one user.

A computer program product is described that includes a computer-readable medium having computer program logic recorded thereon for enabling a processor-based system to perform multi-modal testing of a software program. The computer program product includes first, second, and third program logic modules. The first program logic module is for enabling the processor-based system to automatically determine a number of clients to be allocated in a targeted environment for participation in a test of a software program for each of a plurality of modes of the test based on a specified cumulative workload. The second program logic module is for enabling the processor-based system to automatically allocate the respective number of clients in the targeted environment for each mode to perform operations that impose the cumulative workload against the targeted environment, each client of the number of clients imposing a respective proportion of the cumulative load against the targeted environment. The third program logic module is for enabling the processor-based system to execute the test of the software program with respect to the number of clients such that executes the test in a first mode of the plurality of modes with respect to a first number of the clients and that executes the test in a second mode of the plurality of modes with respect to a second number of the clients. The second number is different from the first number. Each client of the first number of clients and each client of the second number of clients simulates use of the software program by at least one user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE
DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 7 illustrates an example client-side error log in accordance with an embodiment.

Figure 1:
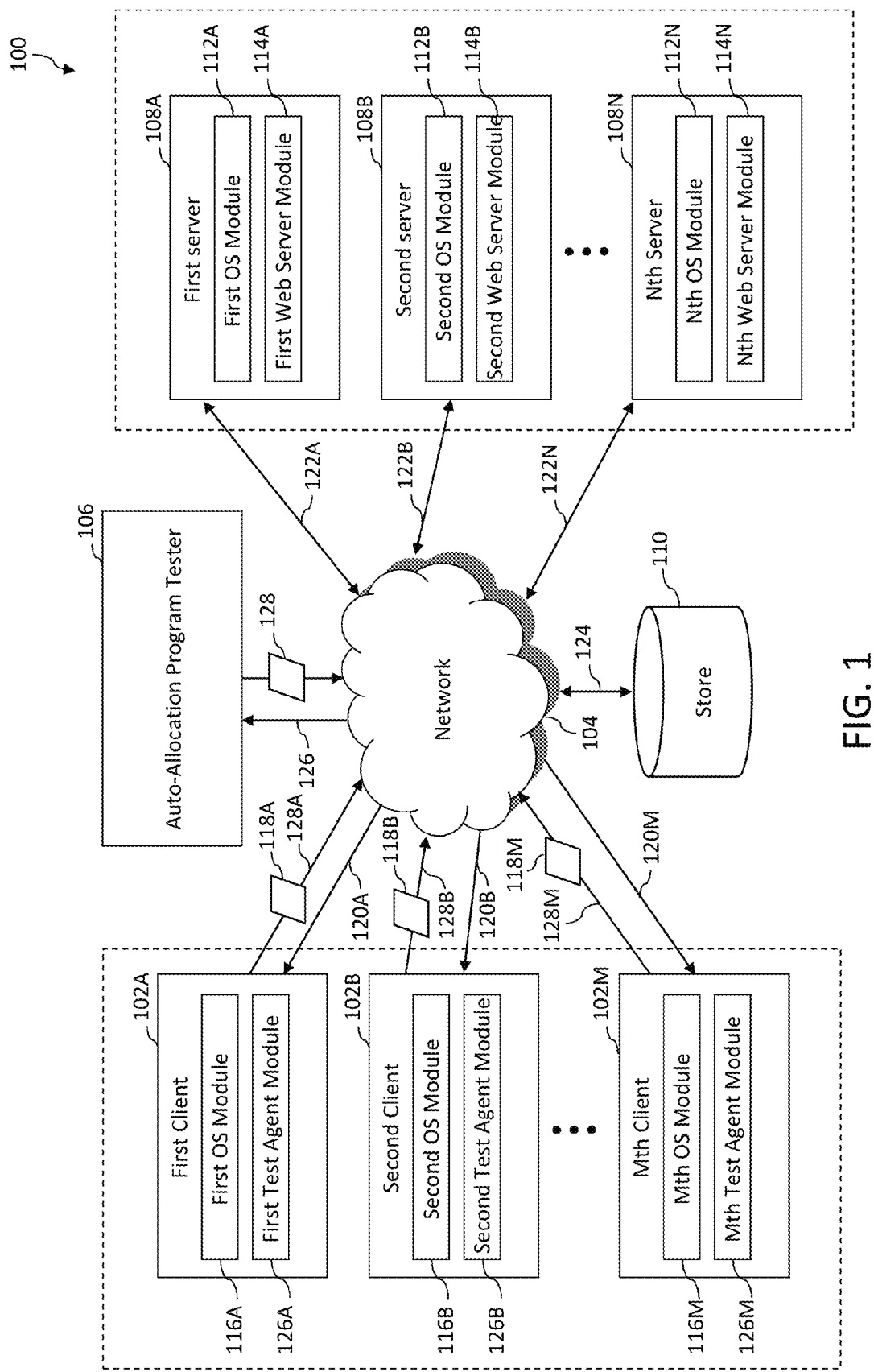
FIG. 1 is a block diagram of an example computer system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of automatically allocating clients for testing a software program. For instance, a number of the clients that are to be allocated for the testing may be determined based on a workload that is to be imposed by the clients during execution of the testing. For example, the number of the clients may be a minimum number of the clients that is capable of accommodating the workload. In accordance with this example, the minimum number of the clients may be allocated in a targeted environment so that the test may be performed on those clients. It will be recognized that additional clients may be allocated along with the minimum number of the clients in the targeted environment to accommodate excess workload.

Some example embodiments are capable of performing multi-modal testing of the software program. In accordance with these embodiments, a single test is defined by code that is configurable to accommodate multiple types of test scenarios. Accordingly, such embodiments are capable of performing the functionality of multiple types of tests using respective modes of the single test. Examples of modes include but are not limited to a functionality mode, a performance mode, a stress mode, and a scalability mode. These example modes are described in further detail below with reference to FIG. 2.

The testing of the software program may simulate usage of the software program by users. Accordingly, the various modes of the test may be configured to simulate respective conditions that may be imposed by such users. Configuring the code that defines the test to accommodate a mode may involve changing parameters that are associated with the test. For instance, central processing unit (CPU) utilization, memory utilization, and/or a number of network connections that are utilized by the test may be varied to accommodate the mode.

Example techniques described herein have a variety of benefits as compared to conventional techniques for testing a software program. For instance, the example techniques may provide a software program-agnostic scalable framework which is capable of scaling up and down dynamically based on a workload that is imposed against a target environment. For instance, scaling the framework may involve changing a number of clients that are to participate in the test, changing the workload, changing information that is reported and/or a format thereof, etc. The example techniques may be capable of accommodating arbitrary (e.g., previously unknown) test scenarios. For instance, the techniques may be capable of generating a targeted load for each of the test scenarios, measuring latency and/or throughput of the software program, automatically collecting information regarding performance, scalability, availability, etc. of the software program, performing triage, and/or generating reports that include the aforementioned information.

The example techniques may accelerate a delivery of a test to obtain a relatively greater test coverage with a relatively low cost, as compared to conventional software program tests. Performance, race condition, and/or scalability problems regarding a software program may be discovered earlier in the development cycle of the software program by using the example techniques. Any suitable software program may be tested using the example techniques. For instance, the software program may be a cloud service. The example techniques may be capable of testing any type of cloud service and/or any size of cloud service.

The example techniques may consume less time and/or fewer resources than the conventional techniques. For instance, the example techniques may collect test information only if the test information indicates a failure with respect to the software program. The example techniques may be implemented on top of standard off-the-shelf cloud platform technology and/or cloud-based services.

FIG. 1 is a block diagram of an example computer system 100 in accordance with an embodiment. Generally speaking, computer system 100 operates to test software programs. As shown in FIG. 1, computer system 100 includes a plurality of clients 102A-102M, a network 104, an auto-allocation program tester 106, a plurality of servers 108A-108N, and a store 110. Communication among clients 102A-102M, auto-allocation program tester 106, servers 108A-108N, and store 110 is carried out over network 104 using well-known network communication protocols. Network 104 may be a wide-area network (e.g., the Internet), a local area network (LAN), another type of network, or a combination thereof.

Clients 102A-102M are processing systems that are capable of communicating with servers 108A-108N. An example of a processing system is a system that includes at least one processor that is capable of manipulating data in accordance with a set of instructions. For instance, a processing system may be a computer (e.g., a desktop computer, a laptop computer, a tablet computer, etc.), a personal digital assistant, a cellular telephone, etc. Although clients 102A-102M are described herein as being processing systems, it will be recognized that any one or more of clients 102A-102M may be implemented as a virtual machine.

Clients 102A-102M may be configured to perform client-side aspects of software programs (e.g., cloud services) that are to be tested in accordance with the example embodiments described herein. Clients 102A-102M are configured to provide requests 118A-118N (e.g., HTTP requests) to servers 108A-108N for the purpose of accessing server-side aspects of the software programs that are executed thereon. Examples of a cloud service (a.k.a. a web application or a web service) include but are not limited to webmail (e.g., Gmail®, Yahoo!® mail, and MSN® mail), an online retail application, an online auction, a wiki, an online social networking service (e.g., Facebook®, LinkedIn®, MySpace®, or Twitter®), an online photo hosting service (e.g., Flickr® or Picasa®), an online office suite service (e.g., Google® Docs), an online data storage service (e.g., Egnyte®, Amazon® S3, or Windows Azure®), etc. For instance, a user may initiate a request using a client (e.g., a Web browser, Web crawler, non-Web-enabled client, etc.) deployed on a client 102 that is owned by or otherwise accessible to the user for the purpose of accessing server-side aspects of a software program via network 104.

Clients 102A-102M receive access to the server-side aspects of the software programs that are identified in the respective requests 112A-112M via respective connections 120A-120M and one or more of connections 122A-122N. For instance, client 102A receives access to server-side aspects of software program(s) that are identified in request(s) 118A via connection 120A and one or more of connections 122A-122N, depending on which of the servers 108A-108N execute the server-side aspects of the software program(s); client 102B receives access to server-side aspects of software program(s) that are identified in request(s) 118B via connection 120B and one or more of connections 122A-122N, depending on which of the servers 108A-108N execute the server-side aspects of the software program(s), and so on.

In accordance with some example embodiments, clients 102A-102M are capable of accessing Web sites hosted by servers 108A-108N, so that clients 102A-102M may access information that is available via the Web sites. Such information may include documents (e.g., Web pages, images, video files, etc.), output of executables, or any other suitable type of information. The Web pages may be provided as hypertext markup language (HTML) documents and objects (e.g., files) that are linked therein, for example. In accordance with these embodiments, the information may be provided by server-side aspects of software programs that are identified in requests that are provided by clients 102A-102M.

Clients 102A-102M include respective operating system (OS) modules 116A-116M and test agent modules 126A-126M. Each of the OS modules 116A-116M executes an operating system on the client that includes that OS module. Each operating system performs operations which may include but are not limited to managing computer hardware resources, providing services for execution of software programs, etc. on the corresponding client. Examples of an operating system include but are not limited to Berkeley Software Distribution™ (BSD), developed and distributed by the Computer Systems Research Group (CSRG) of the University of California, Berkeley, or descendants thereof; Linux developed and distributed under the GNU Project; Mac OS® developed and distributed by Apple Inc., Microsoft Windows® developed and distributed by Microsoft Corporation; and UNIX™ developed and distributed by AT&T.

Each of the test agent modules 126A-126M is configured to execute a respective test agent in accordance with the program testing instructions 128 received from auto-allocation program tester 106. Each test agent performs a respective subset of the operations that impose the specified workload during the testing of the software program(s). The test agent modules 126A-126M perform client-side aspects of the software program(s).

Auto-allocation program tester 106 is a processing system that tests software program(s), which may be deployed on any one or more of clients 102A-102M. Auto-allocation program tester 106 provides program testing instructions 128 regarding testing of software program(s) among clients 102A-102M via one or more of connections 120A-120M. For example, auto-allocation program tester 106 may provide the program testing instructions 128 to only those clients that are to participate in testing of the software program(s). In another example, auto-allocation program tester 106 may provide the program testing instructions 128 to all of the clients 102A-102M, regardless whether the clients 102A-102M are to participate in the testing of the software program(s). In accordance with this example, each of the clients 102A-102M may be capable of determining whether it is to participate in the testing of the software program(s) based on the instructions 128. Auto-allocation program tester 106 receives access to client-side aspects of the software program(s) via connection 126 and one or more of connections 128A-28M. Auto-allocation program tester 106 receives access to server-side aspects of the software program(s) via connection 126 and one or more of connections 122A-122N.

In accordance with example embodiments, auto-allocation program tester 106 automatically determines how many of the clients 102A-102M are to be allocated for testing a designated software program based on a specified workload that is to be imposed during the testing. Auto-allocation program tester 106 automatically deploys the designated software program on the determined number of the clients 102A-102M and executes the test with respect to those clients. For instance, auto-allocation program tester 106 may automatically deploy an instance of the designated software program on each of the determined number of the clients 102A-102M. Auto-allocation program tester 106 may select among various modes of the test to achieve the designated workload and/or to test various capabilities of the software program. For instance, a functional mode may correspond to a first workload, a performance mode may correspond to a second workload, a stress mode may correspond to a third workload, a scalability mode may correspond to a fourth workload, and so on. Some example techniques for automatically allocating clients for testing a software program are discussed below with reference to FIGS. 2-8.

Each of servers 108A-108N is a processing system that is capable of communicating with clients 102A-102M and auto-allocation program tester 106. Each of servers 108A-108N is configured to perform operations with regard to the software program to impose a respective proportion of the specified workload. Although servers 108A-108N are described herein as being processing systems, it will be recognized that any one or more of servers 108A-108N may be implemented as a virtual machine.

Servers 108A-108N include respective operating system (OS) modules 112A-112N and web server modules 114A-114N. Each of the OS modules 112A-112N executes an operating system on the server that includes that OS module. Each operating system performs operations which may include but are not limited to managing computer hardware resources, providing services for execution of software programs, etc. on the corresponding client.

Each of the web server modules 114A-114N provides access to software program(s) that are identified by requests (e.g., requests 118A-118N) received from clients 102A-102M and/or that are identified by program testing instructions (e.g., program testing instructions 128) received from auto-allocation program tester 106. Upon receiving a request or instruction that identifies a software program, web server modules 114A-114N may access store 110 via respective connections 122A-122N and connection 124 to write information thereto and/or to read information therefrom in accordance with operations that are defined by the software program.

In accordance with some example embodiments, servers 108A-108N host web sites via which information may be accessed by clients 102A-102M and/or by auto-allocation program tester 106. Such information may include documents (e.g., Web pages, images, video files, etc.), output of executables, or any other suitable type of information. In accordance with these embodiments, the information may be provided by software program(s) that are identified in requests received from clients 102A-102M and/or in program testing instructions 128 received from auto-allocation program tester 106.

Auto-allocation program tester 106 may be implemented in various ways to automatically allocate clients for testing a software program, including being implemented in hardware, software, firmware, or any combination thereof. For example, auto-allocation program tester 106 may be implemented as computer program code configured to be executed in one or more processors. In another example, auto-allocation program tester 106 may be implemented as hardware logic/electrical circuitry. In an embodiment, auto-allocation program tester 106 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Store 110 stores information regarding software programs. Such information may include but is not limited to configuration information, metadata, and content regarding the software programs. Configuration information is information that specifies how a software program is to be configured. Metadata may include any suitable information regarding a software program, such as information that indicates a network binding regarding the software program. Content may include documents (e.g., Web pages, images, video files, etc.), output of executables, etc. Store 110 may be any suitable type of store. One type of store is a database. For instance, store 110 may be a relational database, an entity-relationship database, an object database, an object relational database, an extensible markup language (XML) database, etc. Store 110 is shown in FIG. 1 to be external to servers 108A-108N for illustrative purses and is not intended to be limiting. It will be recognized that store 110 or a portion thereof may be included in any one or more of servers 108A-108N. For instance, store 110 or a portion thereof may be distributed across two or more of servers 108A-108N.

Testing that is performed by auto-allocation program tester 106 is described herein as being performed with respect to a plurality of clients 102A-102M for illustrative purposes and is not intended to be limiting. It will be recognized that the testing that is performed by auto-allocation program tester 106 may be performed with respect to a single client. In fact, auto-allocation program tester 106 may be incorporated into the single client. It will be recognized that the aforementioned testing need not necessarily be performed via a network, such as network 104. Furthermore, computer system 100 need not necessarily include user systems servers 108A-108N. For instance, the aforementioned testing may be performed entirely in an on-premises environment, which may not include servers 108A-108N.

Figure 2:
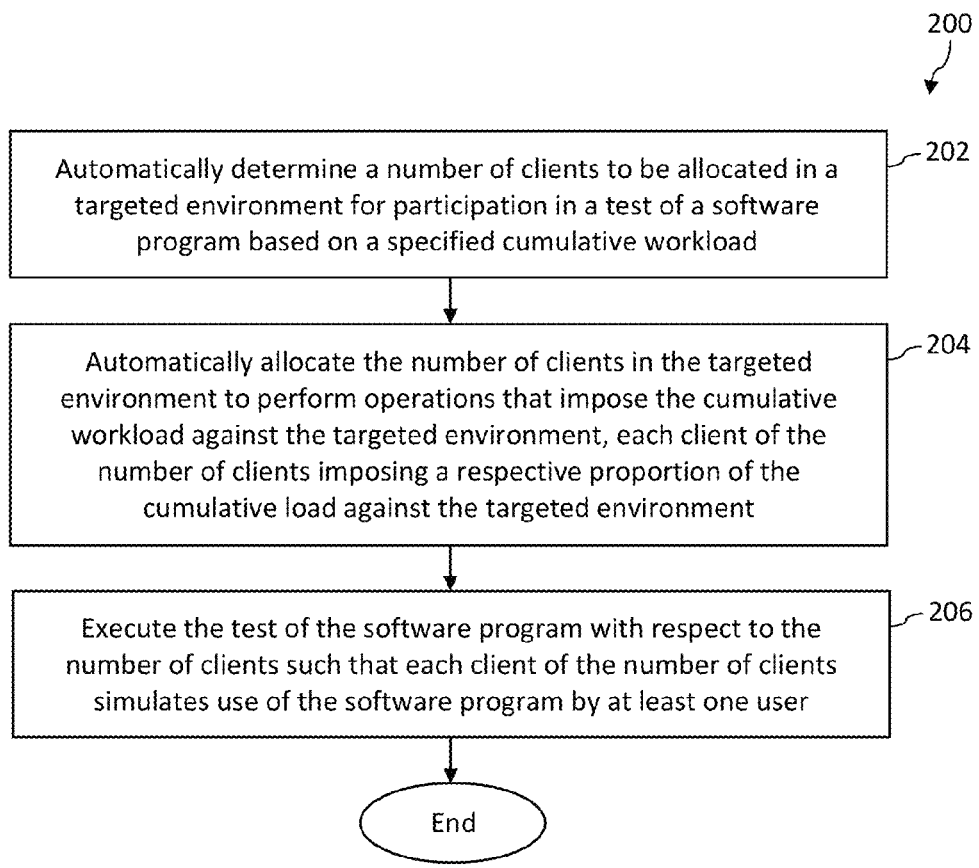
FIGS. 2-4 depict flowcharts of example methods for automatically allocating clients for software program testing in accordance with embodiments.
Figure 3:
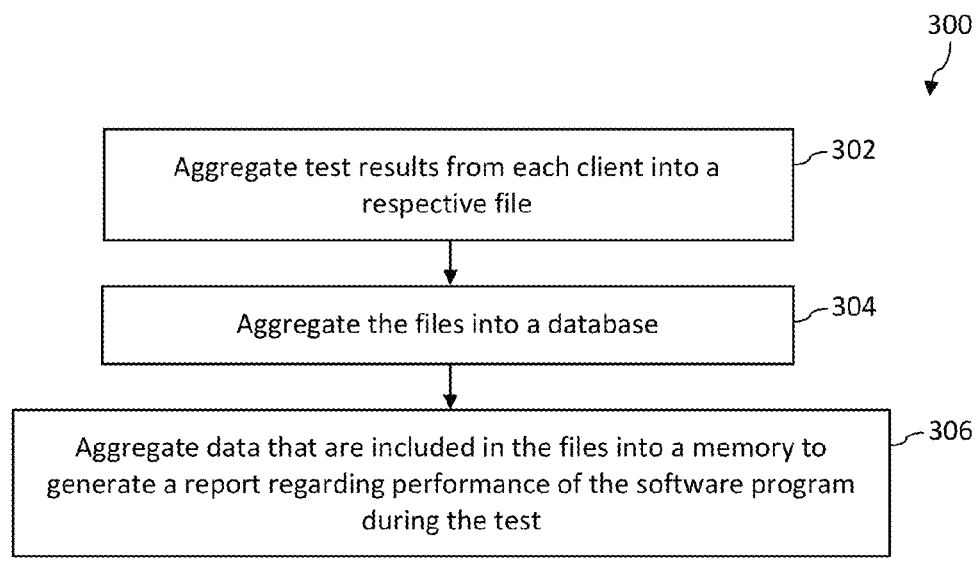
Figure 4:
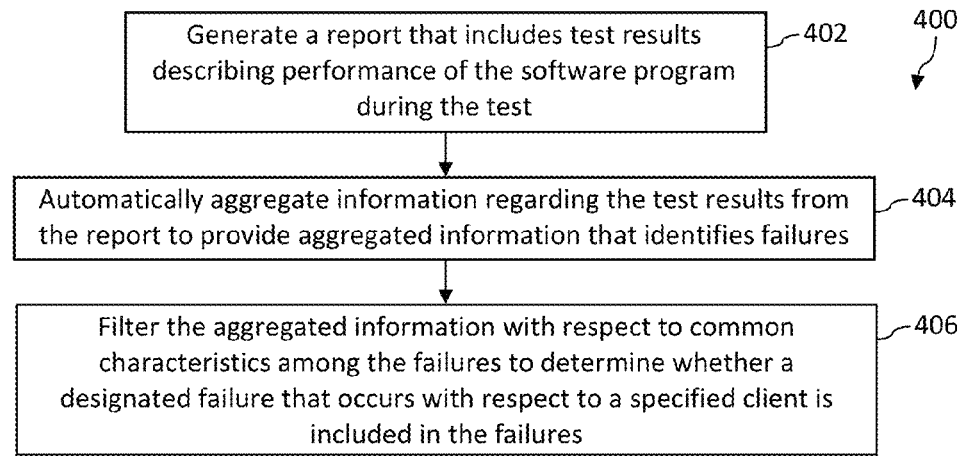
Figure 5:
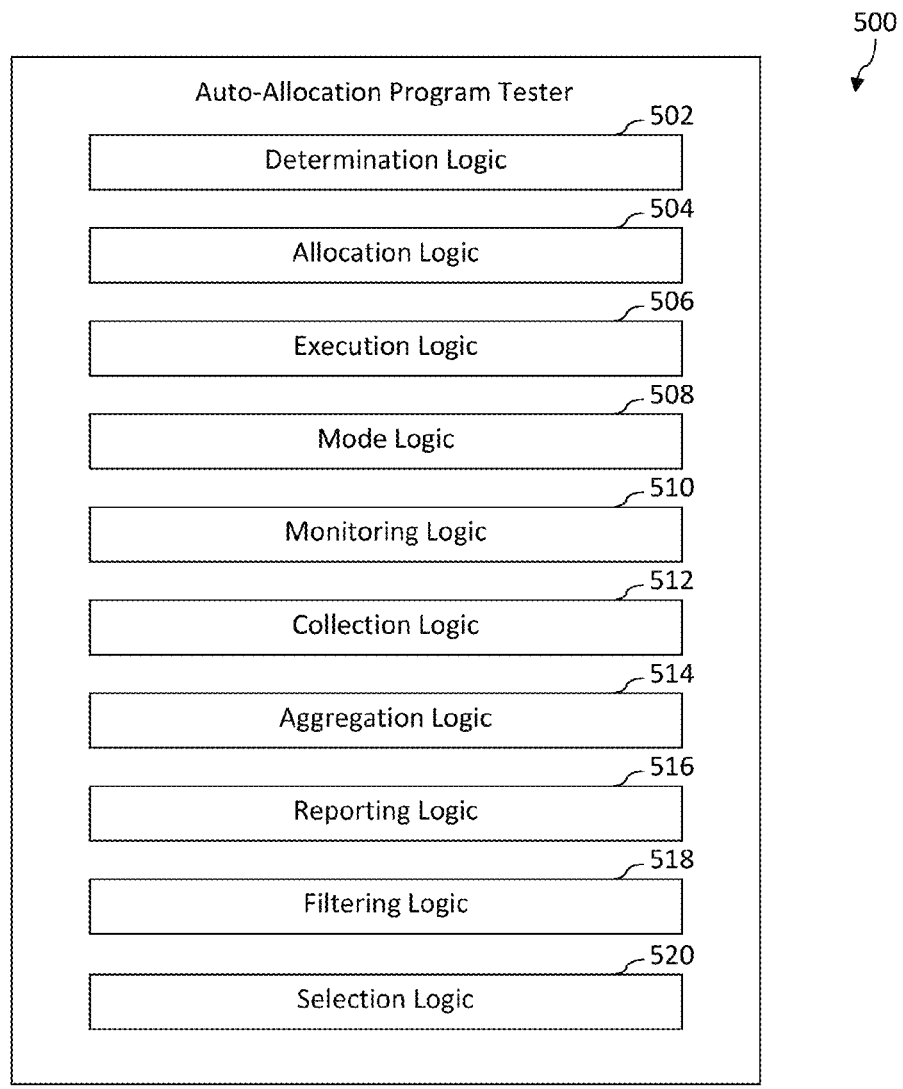
FIG. 5 is a block diagram of an example implementation of an auto-allocation tester shown in FIG. 1 in accordance with an embodiment.

FIGS. 2-4 depict flowcharts 200, 300, and 400 of example methods for automatically allocating clients for software program testing in accordance with embodiments. Flowcharts 200, 300, and 400 may be performed by auto-allocation program tester 106 of computer system 100 shown in FIG. 1, for example. For illustrative purposes, flowcharts 200, 300, and 400 are described with respect to an auto-allocation program tester 500 shown in FIG. 5, which is an example of an auto-allocation program tester 106, according to an embodiment. As shown in FIG. 5, auto-allocation program tester 500 includes determination logic 502, allocation logic 504, execution logic 506, model logic 508, monitoring logic 510, collection logic 512, aggregation logic 514, reporting logic 516, filtering logic 518, and selection logic 520. Further structural and operational embodiments will be apparent to persons skilled in the relevant art(s) based on the discussion regarding flowcharts 200, 300, and 400.

As shown in FIG. 2, the method of flowchart 200 begins at step 202. In step 202, a number of clients to be allocated in a targeted environment for participation in a test of a software program is automatically determined based on a specified cumulative workload. In an example implementation, determination logic automatically determines the number of clients to be allocated in the targeted environment.

At step 204, the number of clients is automatically allocated in the targeted environment to perform operations that impose the cumulative workload against the targeted environment. Each client of the number of clients imposes a respective proportion of the cumulative load against the targeted environment. In an example implementation, allocation logic 504 automatically allocates the number of clients in the targeted environment.

At step 206, the test of the software program is executed with respect to the number of clients such that each client of the number of clients simulates use of the software program by at least one user. For instance, a test agent may be deployed on each client of the number of clients to perform a respective subset of the operations, to coordinate performance of the respective subset of the operations with others of the clients, and to collect test results based on performance of the respective subset of the operations. In an example implementation, execution logic 506 executes the test of the software program with respect to the number of clients. For instance, execution logic 506 may deploy the test agents on respective test agent modules 116A-116N.

In an example embodiment, step 202 includes automatically determining a number of clients to be allocated in the targeted environment for each of a plurality of modes of the test based on the specified cumulative workload. In accordance with this embodiment, step 204 includes automatically allocating the respective number of clients in the targeted environment for each mode. In one aspect of this embodiment, step 206 includes executing the test in a first mode of the plurality of modes with respect to a first number of the clients and executing the test in a second mode of the plurality of modes with respect to a second number of the clients. The second number is different from the first number.

In another aspect of this embodiment, the plurality of modes includes a functional mode and at least one of a performance mode, a stress mode, or a scalability mode. The test in the functional mode is configured to determine whether the software program generates an expected output. The test in the performance mode is configured to determine an amount of time that the software program takes to perform an operation upon receipt of an instruction to perform the operation. The test in the stress mode is configured to determine a capability of the software program to remain operational (e.g., continue to provide an expected output) in response to an increasing load over a period of time. The test in the scalability mode is configured to incrementally increase a workload that is associated with the test and to determine, at each incremental increase, a number of clients that are to be allocated in a targeted environment to perform operations that impose the workload against the targeted environment In some example embodiments, one or more steps 202, 204, and/or 206 of flowchart 200 may not be performed. Moreover, steps in addition to or in lieu of steps 202, 204, and/or 206 may be performed. For instance, in an example embodiment, the method of flowchart 200 includes selecting characteristics of the test that are to be monitored based on a type of the software program. In an example implementation, selection logic 520 selects the characteristics of the test that are to be monitored. In accordance with this embodiment, the method of flowchart 200 further includes aggregating values of the characteristics based on the type of the software program. In an example implementation, aggregation logic 514 aggregates the values of the characteristics. In an aspect of this embodiment, step 204 includes automatically allocating a first subset of the number of clients in an on-premises environment that is included in the targeted environment and automatically allocating a second subset of the number of clients in a cloud environment that is included in the targeted environment. In accordance with this aspect, performance of the software program is monitored with respect to the first subset and the second subset simultaneously. In an example implementation, monitoring logic 510 monitors the performance of the software program with respect to the first subset and the second subset simultaneously.

In another example embodiment, the method of flowchart 200 includes collecting a first subset of test results that are based on performance of the operations that impose the cumulative workload in response to each test result in the first subset indicating an error. In accordance with this embodiment, the method of flowchart 200 further includes not collecting a second subset of the test results in response to each test result in the second subset not indicating an error. In an example implementation, collection logic 512 collects the first subset of the test results and does not collect the second subset of the test results.

In yet another example embodiment, the method of flowchart 200 includes the steps that are shown in flowchart 300 of FIG. 3. As shown in FIG. 3, the method of flowchart 300 begins at step 302. In step 302, test results from each client are aggregated into a respective file. In an example implementation, aggregation logic 514 aggregates the test results from each client into a respective file.

At step 304, the files are aggregated into a database. In an example implementation, aggregation logic 514 aggregates the files into a database that is included in store 110.

At step 306, data that are included in the files are aggregated into a memory to generate a report regarding performance of the software program during the test. For instance, a dynamic interval may be used to aggregate a predetermined fixed number of the data that are included in the files into the memory. The dynamic interval indicates a period of time between temporally adjacent data. In an example implementation, aggregation logic 514 aggregates the data that are included in the files into a memory that is included in store 110.

In still another example embodiment, the method of flowchart 200 includes the steps that are shown in flowchart 400 of FIG. 4. As shown in FIG. 4, the method of flowchart 400 begins at step 402. In step 402, a report is generated that includes test results describing performance of the software program during the test. In an example implementation, reporting logic 516 generates the report that includes the test results.

At step 404, information regarding the test results is automatically aggregated from the report to provide aggregated information that identifies failures. In an example implementation, aggregation logic 514 automatically aggregates the information regarding the rest results form the report to provide the aggregated information that identifies the failures.

At step 406, the aggregated information is filtered with respect to common characteristics among the failures to determine whether a designated failure that occurs with respect to a specified client is included in the failures. In an example implementation, filtering logic 518 filters the aggregated information with respect to the common characteristics to determine whether the designated failure that occurs with respect to the specified client is included in the failures.

In an aspect of this embodiment, a determination may be made that a subset of the aggregated information that identifies a specified failure corresponds to a designated common characteristic, which corresponds to the designated failure, to an extent that exceeds a threshold. In an example implementation, determination logic 502 determines that the subset of the aggregated information that identifies the specified failure corresponds to the designated common characteristic to an extent that exceeds the threshold. In accordance with this aspect, a determination is made that the designated failure is included in the failures in response to determining that the subset of the aggregated information that identifies the specified failure corresponds to the designated common characteristic to the extent that exceeds the threshold. In an example implementation, determination logic 502 determines that the designated failure is included in the failures.

It will be recognized that auto-allocation program tester 500 may not include one or more of determination logic 502, allocation logic 504, execution logic 506, model logic 508, monitoring logic 510, collection logic 512, aggregation logic 514, reporting logic 516, filtering logic 518, and/or selection logic 520. Furthermore, auto-allocation program tester 500 may include modules in addition to or in lieu of determination logic 502, allocation logic 504, execution logic 506, model logic 508, monitoring logic 510, collection logic 512, aggregation logic 514, reporting logic 516, filtering logic 518, and/or selection logic 520.

In an example embodiment, a framework may be employed to dynamically scale deployment of the test among clients 102A-102M. For instance, the framework may be capable of deploying the test on a single client, hundreds of clients, thousands of clients, etc. to test characteristics of the software program under a variety of conditions (e.g., peak load, expected load, etc.). The framework may use a cloud platform to provision and/or de-provision clients 102A-102M on demand. In accordance with this embodiment, the framework as a service may launch one or more of clients 102A-102M based on the specified cumulative workload. For instance, ten (or any other suitable number) of the clients 102A-102M may be may be sufficient for performing the test in the performance mode or the stress mode for one test pass of a single server deployment. The framework may automatically provision more of the clients 102A-102M on demand and/or de-provision client(s) when the test pass status is "closed", meaning that the test is complete. The number of clients that are provisioned for the test is based on the configuration of each test pass configuration. By using a scalable automatic deployment, the framework may be used to test against any suitable size of the software program.

In another example embodiment, a framework may be employed to perform multiple levels of aggregation and filtering with respect to test results that are generated during testing of the software program. For example, testing an enterprise application running on a large scale deployment in a stress mode may involve simulating thousands of clients in parallel, which may correspond to thousands of transactions per second depending on the capacity of the enterprise application. In accordance with this example, such testing may last for hours or days. Hundreds, thousands, or millions of data entries may be collected per test pass. A substantial amount of support data (e.g., server state per role, server side error, event logs, etc.) may be collected in addition to the aforementioned data entries for processing (e.g., generating reports).

Accordingly, multiple aggregations and filtering operations may be performed on different levels of the framework. For instance, an assumption may be made that a most detailed report that an end user might want is a curve chart of specified performance counts in a time trend (e.g., the CPU usage for each service role, the failure rate throughout the execution period, etc.). The aggregations may be performed using a dynamic interval to generate a fixed number of aggregated data. The fixed number of aggregated data may be used to provide a relatively high definition chart for investigation using a least amount of data as possible. For example, assume for purposes of illustration that 400 points of aggregated data are desired. If each test case execution duration is 20 minutes, the aggregation interval may be 20*60/400=3 seconds. The test results that correspond to each 3 second interval may be aggregated into a single respective data entry (i.e., one data entry for each interval). Testing an enterprise-level application in a performance mode or a stress mode may provide thousands of test results in a 3 second interval. Having one data entry per fixed interval may assist in limiting a quantity of the test results to a manageable level.

Aggregation may be performed on a variety of test data types. Examples of test data types include but are not limited to test results for each test case and step iteration, test failures for each test case and step iteration, performance factors monitored from a client-side or a server-side, server error logs monitored from the server side, event logs monitored from the client side and the server side, etc. The test results may be filtered based on any suitable criteria. For example, test results may be collected only with regard to failures of the software program for non-performance sensitive test results. In accordance with this example, test results regarding passed validation steps may not be included in the collected test results. In another example, event logs may be filtered by query (e.g., Even XPath query). In yet another example, server error logs may be filtered by error level.

Aggregation may be performed on a variety of levels. For instance, an individual client may aggregate the test results, client-side performance counters, and event logs locally in memory. The aggregation may be based primarily on the timeline, for example. Server-side aggregation may be executed when the test case execution is completed and all of the clients' aggregated test results are uploaded. The aggregation may be based on the timeline and/or roles (e.g., client, frontend, mid-layer, and database).

In yet another example embodiment, monitoring of a software program is scalable among various tiers of the software program. For instance, the software program may have hundreds of individual server instances, servicing in different service roles and/or in different tiers. An architecture for the software program may include a frontend (presentation layer), a mid-layer (business layer), a database (data layer), and a client if the software program is a rich client solution. A scalable monitoring solution may be employed to collect and aggregate different types of state data from different roles and/or clients. The monitoring solution may be used to apply a different monitoring setting on each server role depending on the nature of that server role. Monitoring may be performed with respect to a variety of types of monitoring targets. Examples of a monitoring target include but are not limited to a performance factor (e.g., performance counters of an operating system (OS), custom performance counters logged by test code, etc.), an event (e.g., event of an OS), and a log. Monitoring may be performed with respect to multiple layers of a monitoring target. For instance, the monitoring configuration may be grouped by role to support an N-layer software application, where N is a positive integer. Multiple clients may be supported in each role (e.g., 20 front end server instances). Each test scenario may have its own monitoring scenario for the various test roles.

In still another example embodiment, heterogeneous platform monitoring is used during testing of the software program. For instance, the software program may be deployed on multiple platforms (e.g., a Microsoft Windows® platform and a non-Microsoft Windows platform). The software program may be deployed in multiple locations (e.g., on-premises and in the cloud). If the software program includes a rich client, the client may be run on a different platform from the test. Different test environments may be deployed on different platforms. The framework is capable of supporting the software program being deployed on multiple types of predetermined platforms. The framework can be extended to support platforms in addition to the predetermined platforms by adding plug-ins that implement a suitable interface (e.g., an IMonitor interface).

In an example embodiment, a framework may be employed that is capable of scaling with respect to development of the test for testing the software program. In a conventional framework, development of the performance, stress, and scalability test cases is isolated from development of the functional test case. Accordingly, a substantial amount of effort is employed to obtain code coverage in the performance, stress, and scalability test cases that is similar to the code coverage obtained in the functional test case. In accordance with the aforementioned embodiment, a functional test case may be converted into a performance, stress, and/or scalability test case at a relatively low cost. With a standard test case development tool, for example, the functional test case may be converted to a different mode (e.g., performance, stress, or scalability), automatically with relatively little (e.g., no) additional development cost.

A script-like execution shell may help to fully reuse existing functional test codes. An example of such an execution shell is represented using XML code below for illustrative purposes.

```
<StepGroups>
    <Setup FailureAction="FailAndStop">
        <Variable Type="@(Common).EDMMeta" Name="Sserv1">
            <Arg Type="string">WoltersKluwer/SalesTaxRates</Arg>
        </Variable>
        <Step Method="@(Common).EDMMeta.get_QueryBuilderCollection"
Object="Sserv1" Result="Sugc1"/>
    </Setup>
    <Regular>
        <StepGroup FailureAction="FailAndStop">
            <Step Method="@(Common).QueryBuilderCollection.
            GetRandomUrl"
Object="Sugc1" Result="Surl1"/>
            <Variable Name="$rq1" Type="@(Common).Request">
                <Arg Type="string">Surl1</Arg>
            </Variable>
            <Step Method="@(Common).Request.GetReponse" Result="Srp1"
Object="$rq1" Title="Query WoltersKluwer SalesTaxRates"
PerfStep="true" >
                <Arg Type="bool">false</Arg>
            </Step>
            <Step Method="@(Common).Response.Read" Object="Srp1" />
            <Step Method="@(Perf).Utility.ValidateResponse" Expect="true">
                <Arg Type="@(Common).Request">$rq1</Arg>
                <Arg Type="@(Common).Response">Srp1</Arg>
                <Arg Type="string">$E2EHARNESS.TestType</Arg>
            </Step>
        </StepGroup>
    </Regular>
</StepGroups>
```

For instance, linear code (e.g., such as linear .Net code) may be translated into the above-recited XML test case script. The functional test code may be separated among setup steps, regular steps, and cleanup steps. The setup steps are performed before the regular steps. The regular steps are performed before the cleanup steps. The code corresponding to the regular steps may be separated among multiple scenarios. The multiple scenarios may be performed with respect to each thread of the test. An execution weight may be assigned to each type of steps (i.e., setup, regular, cleanup, and scenario). For each of the scenario steps, test results are collected only if the step is sensitive to performance. The scenario steps for which results are not collected nevertheless may affect the test results. Thus, a report that is generated in response to performance of the scenario steps reflects the actual performance of the software program. The prerequisite and validation test code does not affect the test results. This also may reduce an amount of the test results that are aggregated and uploaded to store 110.

In another example embodiment, runtime resources are automatically optimized. For instance, the stress and scalability modes may generate a substantial amount of data including test results, logs, and monitoring results from clients. In accordance with this embodiment, the framework is capable of automatically determining when and/or how to compute, aggregate, upload, and dispose of the test results to avoid overloading resources, such as the CPU, memory, and network and/or to avoid affecting the performance results of the test code. For instance, the framework uploading results may substantially affect the response time of the performance test if the test is input/output (I/O) sensitive. Because the framework has client-side monitoring, the framework has knowledge of the CPU and I/O status of each client. Accordingly, the framework may determine when and/or how to perform operations. Thresholds may be established for the CPU, memory, and network resources. For instance, a CPU utilization threshold may be set at 85%, a memory threshold may be set at 75%, and a network threshold may be set at 50%. These thresholds are provided for illustrative purposes and are not intended to be limiting. The thresholds may be set at any suitable respective values. When the memory threshold is reached, the test results may be removed from the memory. Data may be uploaded from a disk only in response to test execution being completed or terminated. In accordance with this embodiment, the test results may be self-descriptive and may be uploaded order-less (i.e., without regard to order).

In yet another example embodiment, the test of the software program may be implemented to be operation controllable. For instance, the software program may have a capacity on a specified deployment setting. The capacity may be determined by an estimated capacity plan (e.g., we plan to support X concurrent users sending Y operations per second) or a resource limitation (e.g., we can support X concurrent users sending Y operations per second on a specified deployment to provide a positive user experience). A performance test or a stress test that generates a workload that exceeds the capacity may cause the test results to become meaningless. Operation controls may be applied at the framework level to cause the test to be executed at a desired rate. The test may be executed in a different operational level to identify the capacity or bottleneck of a specified server deployment. The framework may have built-in operation control to enable testing to achieve the desired operational level.

In still another example embodiment, a framework is employed that supports multiple test modes for a common test. In accordance with this embodiment, different reports may be generated for the various modes of the test with little or no extra cost. Following is example XML code that illustrates how the various modes of the test may be defined:

```
<!--Goal 200 OPS, 8+1 test machine-->
<TestConfigGroup Name="TestSVC" DelayInterval ="60" >
    <TestConfig TestType="Perf" StepDelay="10">
        <OPSConfig OPS1 ="25"/>
        <ThreadPool ThreadCount="300" PoolCount="1"/>
    </TestConfig>
    <TestConfig TestType="Stress" StepDelay="120">
        <OPSConfig OPS1 ="35"/>
        <ThreadPool ThreadCount="300" PoolCount="1"/>
    </TestConfig>
    <TestConfig TestType="Scale" StepDelay="10">
        <OPSConfig OPS1 ="1" OPS2="35"/>
        <ThreadPool ThreadCount="300" PoolCount="1"/>
    </TestConfig>
    <TestConfig TestType="STPerf" StepDelay="10">
        <OPSConfig OPS1 ="10"/>
        <ThreadPool ThreadCount="300" PoolCount="1"/>
    </TestConfig>
    <TestConfig TestType="Custom" StepDelay="1">
        <OPSConfig OPS1 ="1"/>
        <ThreadPool ThreadCount="1" PoolCount="1"/>
    </TestConfig>
</TestConfigGroup>
```

For a single thread performance mode, a single thread mode runs through the regular steps for a limited iteration to identify performance of a particular code path. For a load performance mode, multiple thread modes run through the regular steps at a specified operations-per-second to identify performance under a particular load. For a stress performance mode, a stress mode runs through the regular steps at a specified operations-per-second over a relatively long duration to identify the system availability under an extreme load. A phase may be added at the end of execution to detect whether the software program goes back to its normal state after the stress run. For scalability performance mode, multiple threads run through the regular steps, and the operation control gradually increases from a relatively low operations-per-second to a relatively high operations-per-second to identify the system capacity of a particular service deployment. For a custom performance mode, any suitable combination of operations per second control, runtime, and thread control configuration may be utilized.

In an example embodiment, multiple test scenarios are supported. Based on the software program specification, different test scenarios may have different test goals with regard to performance, stress, and scalability. For instance, activation of a software program may take substantially less load than servicing the software program. In accordance with this embodiment, the framework is capable of applying different test configurations on different user scenarios and/or different performance goals on the reporting. For example, each test scenario may have its own TestConfigGroup, though the test configuration shown in the example XML code above is applied only to test scenario TestSVC for purposes of illustration. Each test scenario may have its own monitoring configuration. Based on the test scenario, the auto-allocation program tester 106 may decide which kinds of the performance counter and information is likely to be useful during investigation (and therefore is to be collected). Each test scenario may have its own performance goal during the reporting.

In another example embodiment, a scalable test result database is employed. Although multiple levels of aggregation may be performed on the client side, a relatively substantial amount of data may be uploaded to the database. The database is configured to be scalable as a test report storage. For instance, the database may be capable of storing results and/or reports from hundreds of test passes for further investigation (e.g., regression and performance trend investigation). In addition to solutions such as database table partitioning and database clustering, other optimization techniques may be performed on a single database level based on the usage of the test data.

Figure 6:
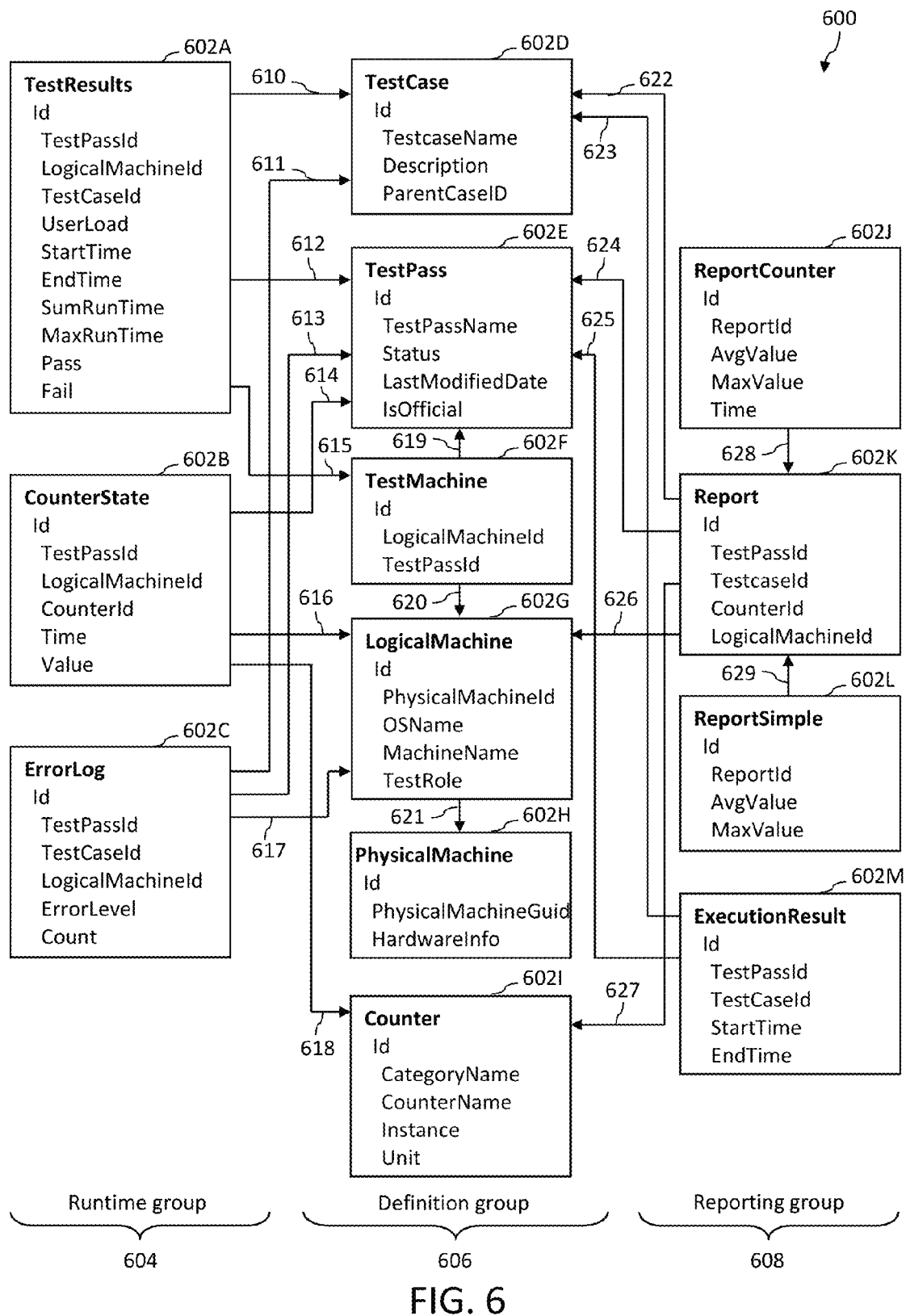
FIG. 6 is a block diagram of an example schema that may be used to define a structure of a database that is included in a store shown in FIG. 1 in accordance with an embodiment.

FIG. 6 is a block diagram of an example schema 600 that may be used to define a structure of a database that is included in a store 110 shown in FIG. 1 in accordance with an embodiment. Schema 600 defines a plurality of types that are represented using a plurality of respective data tables 602A-602M. Data table 602A represents a TestResults type; data table 602B represents a CounterState type; data table 602C represents an ErrorLog type; data table 602D represents a TestCase type; data table 602E represents a TestPass type; data table 602F represents a TestMachine type; data table 602G represents a LogicalMachine type; data table 602H represents a PhysicalMachine type; data table 602I represents a Counter type; data table 602J represents a ReportCounter type; data table 602K represents a Report type; data table 602L represents a ReportSimple type; and data table 602M represents an ExecutionResult type. Each of the data tables 602A-602M includes respective parameters having values that describe the respective type that is represented by that data table. For instance, data table 602H includes a PhysicalMachineGuid parameter and a HardwareInfo parameter, the values of which describe the PhysicalMachine type.

Data tables 602A-602C are associated with a runtime group 604; data tables 602D-602I are associated with a definition group 606; and data tables 602J-602M are associated with a reporting group 608. Data tables 602A-602C in the runtime group 604 store runtime raw test results that are obtained with regard to testing a software program. For instance, the raw test results may include information that is received from one or more of the test agent modules 116A-116N and/or information that is received from auto-allocation program tester 106 (or one or more components thereof). Data tables 602D-602I in the definition group 606 store information that is utilized by data tables 602A-602C of the runtime group 604 and data tables 602J-602M of the reporting group 608. Data tables 602J-602M of the reporting group 608 stores intermediate aggregated report data that may be utilized by a reporting website, for example. For instance, the intermediate aggregated report data may be aggregated at multiple levels (e.g., aggregated into files, then aggregated into a database, and then aggregated into a memory to generate a report regarding performance of the software program).

References 610-618 from data tables 602A-602C in the runtime group 604 point to data tables 602D-602I of the definition group 606. More specifically, references 610, 612, and 615 point from data table 602A to respective data tables 602D, 602E, and 602F. References 614, 616, and 618 point from data table 602B to respective data tables 602E, 602G, and 602I. References 611, 613, and 617 point from data table 602C to respective data tables 602D, 602E, and 602G.

In the definition group 606, references 619 and 620 point from data table 602F to respective data tables 602E and 602G. Reference 621 points from data table 602G to data table 602H.

References 622-627 from data tables 602K and 602M in the reporting group 608 point to data tables 602D, 602E, 602G, and 602I of the definition group 606. More specifically, references 622, 624, 626, and 627 point from data table 602K to respective data tables 602D, 602E, 602G, and 602I. References 623 and 625 point from data table 602M to respective data tables 602D and 602E.

In the reporting group 608, reference 628 points from data table 602J to data table 602K. Reference 629 points from data table 602L to data table 602K. None of the references 610-629 point from the definition group 606. None of the references 610-629 point into the runtime group 604. None of the references 610-629 point into the reporting group 608.

In an example embodiment, reporting of the test results is scalable. For instance, auto-allocation program tester 106 of FIG. 1 or auto-allocation program tester 500 of FIG. 5 may be capable of generating a relatively simple report showing summary results and also may be capable of generating a relatively detailed report showing relevance of a designated performance factor (e.g., response time) of a designated test case on a designated test client and another performance factor (e.g., SQL Server® process CPU usage) on a specified server machine instance of some server role. The report may be returned to the end user in a timely manner. Accordingly, generation of the report may weigh aggregation of the data (which improves the reporting speed) and preservation of the raw data (which increases diversity of the report).

As described above, multiple levels of aggregation may be applied to each phase of the execution and reporting. The final level of aggregation may be a report generator based on the aggregated information uploaded by clients 102A-102M of FIG. 1 and monitoring logic 510 of FIG. 5 and aggregated by role, machine instance, and timeline. In an example, two general types of reports are optimized during this process. The first type of report includes a summary result of the execution (e.g., a table that shows the summary result of the test pass). The second type of report includes a timeline based chart. Any selected set of performance factors may be overlapped in the chart to show relevance. A set of object model APIs may be provided to access the database to generate the reports. A most detailed raw test log may be compressed and uploaded to storage of a cloud platform, for example, by each of the clients 102A-102M so that the logs may be used for further investigation.

In another example embodiment, auto-allocation program tester 106 of FIG. 1 is capable of performing auto-triage with respect to the test results. For instance, an auto-triage operation may be performed in response to performance of the test of the software program in the performance mode or stress mode. Executing the test for an extended period (e.g., multiple days) may result in generation of thousands of error test results and server-side error logs. The auto-triage operation may be performed to summarize the test results and logs, to collaborate with failure information identified in previous run(s), and/or to pattern match in order to automatically determine which failures are known and which failures were previously unknown. The auto-triage operation may lower the investigation cost and/or identify the previously unknown failures for reference in subsequently generated reports.

Each error may be identified as being either a known error or a new error. The known errors that are active and that are associated with a test case may be identified. Information regarding the active known errors may be retrieved (e.g., from store 110). Based on the aggregated results per test case, a similarity between known errors and failures may be determined. Based on the similarity, the new errors may be automatically opened and/or the previously known errors may be signed off. The auto-triage operation may be performed using client-side error log(s) and/or server-side error log(s), examples of which are discussed below with reference to respective FIGS. 7 and 8.

FIG. 7 illustrates an example client-side error log 700 in accordance with an embodiment. Client-side error log 700 includes an error message column 702 and a report count column 704. The error message column 702 lists some example types of error message that may be provided by any one or more of clients 102A-102M based on testing the software program. The report count column 704 lists a number of instances of each error message that occurs with respect to a test pass that is performed on the software program. For example, 365 instances of the BadGateway error message are provided with regard to the test pass that corresponds to client-side error log 700. In another example, 9506 instances of the BadRequest error message are provided with regard to the test pass.

Figure 8:
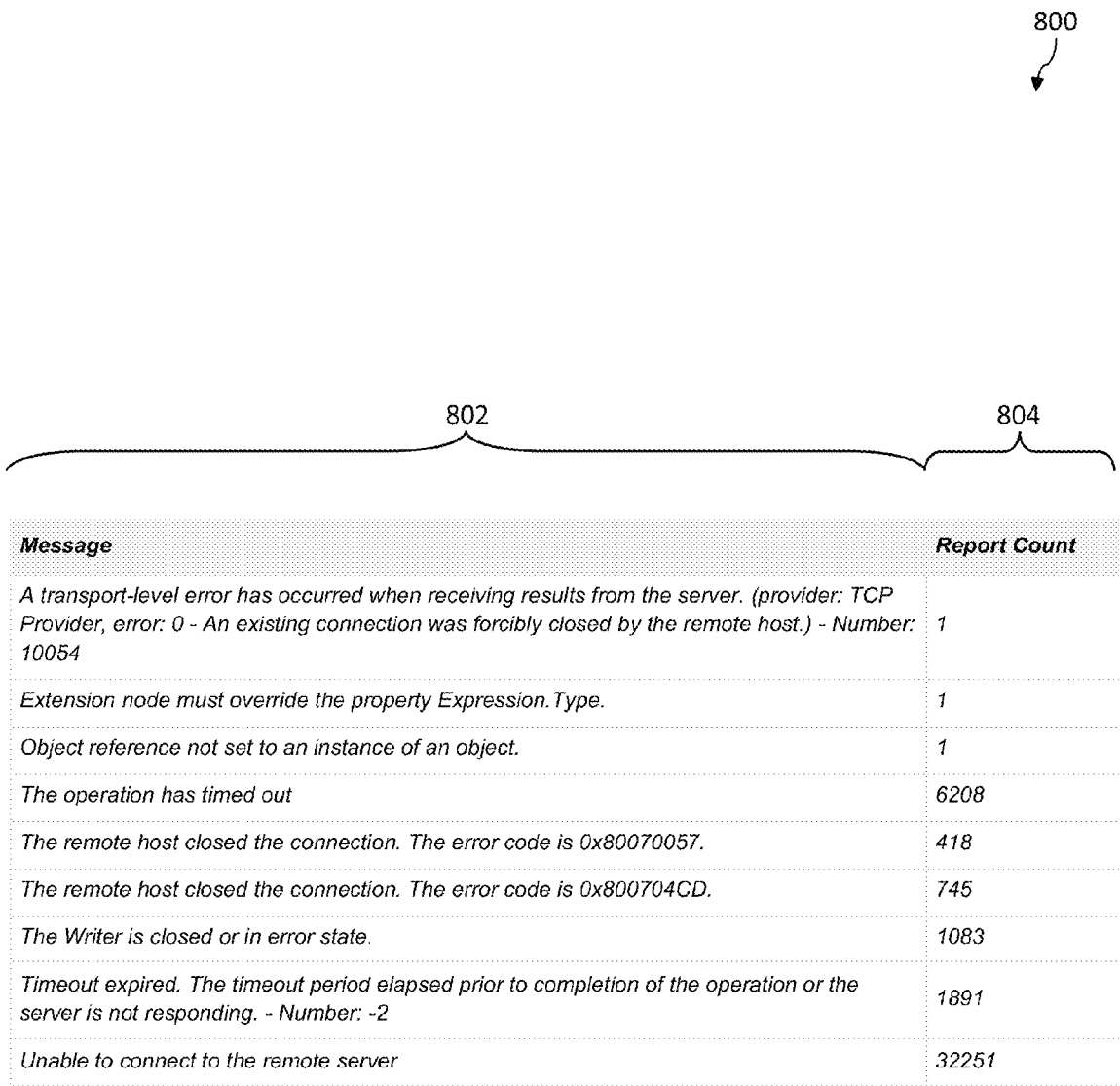
FIG. 8 illustrates an example server-side error log in accordance with an embodiment.

FIG. 8 illustrates an example server-side error log 800 in accordance with an embodiment. Server-side error log 800 includes a message column 802 and a report count column 804. The message column 802 lists some example messages that may be provided by auto-allocation program tester 106 or 500 based on testing the software program. The report count column 804 lists a number of instances of each message that is provided based on the test pass. For example, a message of "Object reference not set to an instance of an object" is provided once. In another example, a message of "The operation has timed out" is provided 6,208 times.

Auto-allocation program tester 106, each of OS modules 112A-112N, each of web server modules 114A-114N, each of test agent modules 116A-116N, determination logic 502, allocation logic 504, execution logic 506, model logic 508, monitoring logic 510, collection logic 512, aggregation logic 514, reporting logic 516, filtering logic 518, selection logic 520, and flowcharts 200, 300, and 400 may be implemented in hardware, software, firmware, or any combination thereof.

For example, auto-allocation program tester 106, each of OS modules 112A-112N, each of web server modules 114A-114N, each of test agent modules 116A-116N, determination logic 502, allocation logic 504, execution logic 506, model logic 508, monitoring logic 510, collection logic 512, aggregation logic 514, reporting logic 516, filtering logic 518, selection logic 520, flowchart 200, flowchart 300, and/or flowchart 400 may be implemented as computer program code configured to be executed in one or more processors.

In another example, auto-allocation program tester 106, each of OS modules 112A-112N, each of web server modules 114A-114N, each of test agent modules 116A-116N, determination logic 502, allocation logic 504, execution logic 506, model logic 508, monitoring logic 510, collection logic 512, aggregation logic 514, reporting logic 516, filtering logic 518, selection logic 520, flowchart 200, flowchart 300, and/or flowchart 400 may be implemented as hardware logic/electrical circuitry. For instance, in an embodiment, one or more of auto-allocation program tester 106, OS modules 112A-112N, web server modules 114A-114N, test agent modules 116A-116N, determination logic 502, allocation logic 504, execution logic 506, model logic 508, monitoring logic 510, collection logic 512, aggregation logic 514, reporting logic 516, filtering logic 518, selection logic 520, flowchart 200, flowchart 300, and/or flowchart 400 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
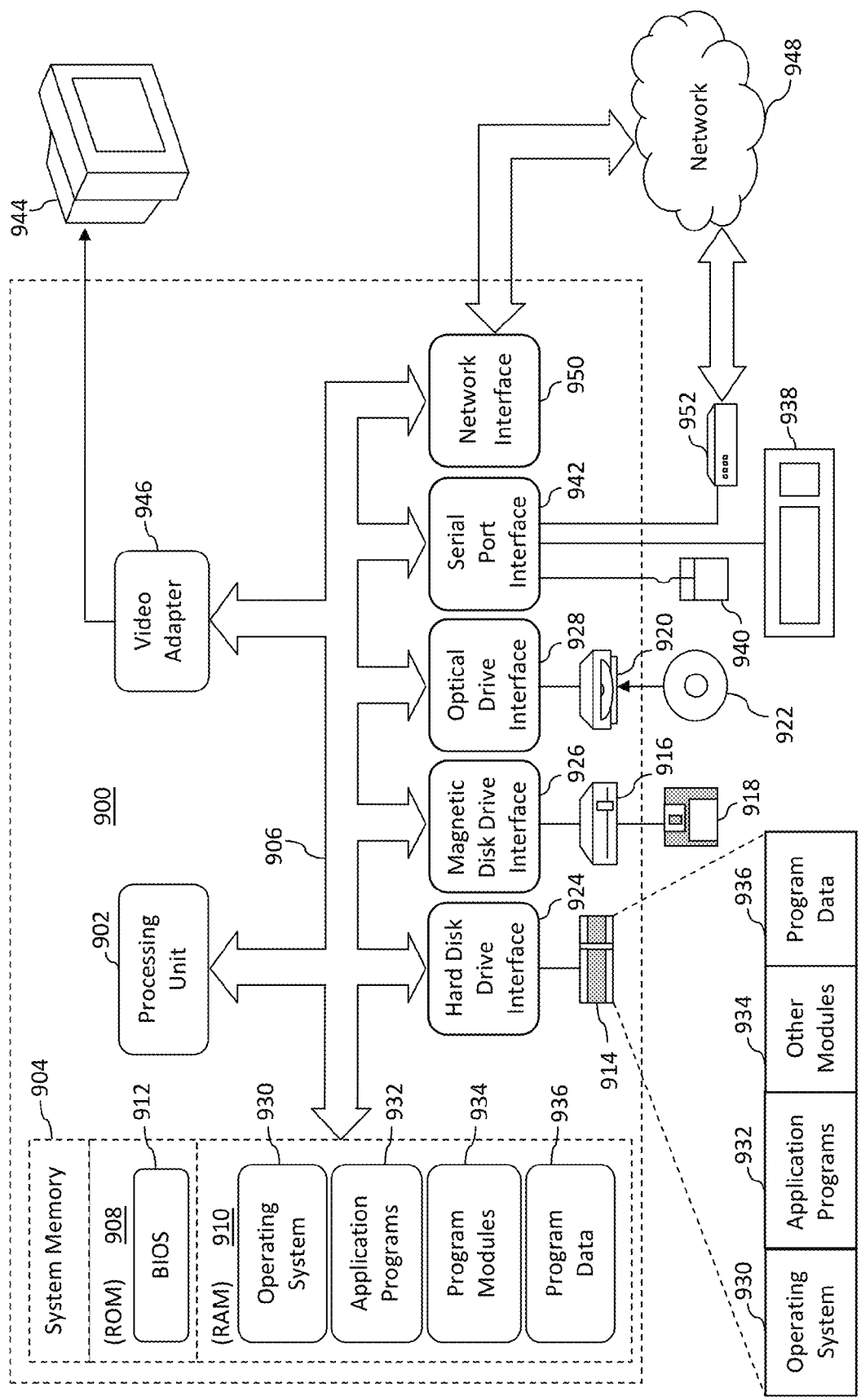
FIG. 9 depicts an example computer in which embodiments may be implemented.

FIG. 9 depicts an example computer 900 in which embodiments may be implemented. Any one or more of the clients 102A-102M, any one or more of servers 108A-108N, or auto-allocation program tester 106 shown in FIG. 1 (or any one or more subcomponents thereof shown in FIG. 5) may be implemented using computer 900, including one or more features of computer 900 and/or alternative features. Computer 900 may be a general-purpose computing device in the form of a conventional personal computer, a mobile computer, or a workstation, for example, or computer 900 may be a special purpose computing device. The description of computer 900 provided herein is provided for purposes of illustration, and is not intended to be limiting. Embodiments may be implemented in further types of computer systems, as would be known to persons skilled in the relevant art(s).

As shown in FIG. 9, computer 900 includes a processing unit 902, a system memory 904, and a bus 906 that couples various system components including system memory 904 to processing unit 902. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computer 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 930, one or more application programs 932, other program modules 934, and program data 936. Application programs 932 or program modules 934 may include, for example, computer program logic for implementing auto-allocation program tester 106, each of OS modules 112A-112N, each of web server modules 114A-114N, each of test agent modules 116A-116N, determination logic 502, allocation logic 504, execution logic 506, model logic 508, monitoring logic 510, collection logic 512, aggregation logic 514, reporting logic 516, filtering logic 518, selection logic 520, flowchart 200 (including any step of flowchart 200), flowchart 300 (including any step of flowchart 300), and/or flowchart 400 (including any step of flowchart 400), as described herein.

A user may enter commands and information into the computer 900 through input devices such as keyboard 938 and pointing device 940. Other input devices (not shown) may include a microphone, joystick, game pad, satellite dish, scanner, or the like. These and other input devices are often connected to the processing unit 902 through a serial port interface 942 that is coupled to bus 906, but may be connected by other interfaces, such as a parallel port, game port, or a universal serial bus (USB).

A display device 944 (e.g., a monitor) is also connected to bus 906 via an interface, such as a video adapter 946. In addition to display device 944, computer 900 may include other peripheral output devices (not shown) such as speakers and printers.

Computer 900 is connected to a network 948 (e.g., the Internet) through a network interface or adapter 950, a modem 952, or other means for establishing communications over the network. Modem 952, which may be internal or external, is connected to bus 906 via serial port interface 942.

As used herein, the terms "computer program medium" and "computer-readable medium" are used to generally refer to media such as the hard disk associated with hard disk drive 914, removable magnetic disk 918, removable optical disk 922, as well as other media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950 or serial port interface 942. Such computer programs, when executed or loaded by an application, enable computer 900 to implement features of embodiments discussed herein. Accordingly, such computer programs represent controllers of the computer 900.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
    automatically determining a number of clients to be allocated in a targeted environment for participation in a test of a software program based on a specified cumulative workload;
    automatically allocating the number of clients in the targeted environment to perform operations that impose the cumulative workload against the targeted environment, each client of the number of clients imposing a respective proportion of the cumulative load against the targeted environment, the automatically allocating including:
        deploying the software program on the number of clients; and
    executing the test of the software program with respect to the number of clients such that each client of the number of clients simulates use of the software program by at least one user.

2. The method of claim 1, wherein automatically determining the number of clients to be allocated comprises:
    automatically determining a number of clients to be allocated in the targeted environment for each of a plurality of modes of the test based on the specified cumulative workload;
    wherein automatically allocating the number of clients comprises:
        automatically allocating the respective number of clients in the targeted environment for each mode; and wherein executing the test of the software program comprises:
executing the test in a first mode of the plurality of modes with respect to a first number of the clients; and
executing the test in a second mode of the plurality of modes with respect to a second number of the clients, the second number being different from the first number.

3. The method of claim 1, wherein automatically determining the number of clients to be allocated comprises:
automatically determining a number of clients to be allocated in the targeted environment for each of a plurality of modes of the test based on the specified cumulative workload;
wherein automatically allocating the number of clients comprises:
automatically allocating the respective number of clients in the targeted environment for each mode;
wherein the plurality of modes includes at least two of a functional mode, a performance mode, a stress mode, or a scalability mode;
wherein the test in the functional mode is configured to determine whether the software program generates an expected output;
wherein the test in the performance mode is configured to determine an amount of time that the software program takes to perform an operation upon receipt of an instruction to perform the operation;
wherein the test in the stress mode is configured to determine a capability of the software program to remain operational in response to an increasing load over a period of time; and
wherein the test in the scalability mode is configured to incrementally increase the cumulative workload and to determine, at each incremental increase, the number of the clients that are to be allocated in the targeted environment to perform the operations that impose the cumulative workload against the targeted environment.

4. The method of claim 1, wherein executing the test of the software program comprises:
deploying a test agent on each client of the number of clients to perform a respective subset of the operations, to coordinate performance of the respective subset of the operations with others of the clients, and to collect test results based on performance of the respective subset of the operations.

5. The method of claim 1, further comprising:
aggregating test results from each client into a respective file of a plurality of files;
aggregating the plurality of files into a database; and
aggregating data that are included in the plurality of files into a memory to generate a report regarding performance of the software program during the test.

6. The method of claim 5, wherein aggregating the data comprises:
using a dynamic interval to aggregate a predetermined fixed number of the data that are included in the plurality of files into the memory, the dynamic interval indicating a period of time between temporally adjacent data.

7. The method of claim 1, further comprising:
generating a report that includes test results describing performance of the software program during the test;
automatically aggregating information regarding the test results from the report to provide aggregated information that identifies a plurality of failures; and
filtering the aggregated information with respect to a plurality of common characteristics among the plurality of failures to determine whether a designated failure that occurs with respect to a specified client is included in the plurality of failures.

8. The method of claim 7, further comprising:
determining that a subset of the aggregated information that identifies a specified failure of the plurality of failures corresponds to a designated common characteristic of the plurality of common characteristics, which corresponds to the designated failure, to an extent that exceeds a threshold; and
determining that the designated failure is included in the plurality of failures in response to determining that the subset of the aggregated information that identifies the specified failure corresponds to the designated common characteristic to the extent that exceeds the threshold.

9. The method of claim 1, further comprising:
selecting characteristics of the test that are to be monitored based on a type of the software program; and
aggregating values of the characteristics based on the type of the software program.

10. The method of claim 9, wherein automatically allocating the number of clients comprises:
automatically allocating a first subset of the number of clients in an on-premises environment that is included in the targeted environment; and
automatically allocating a second subset of the number of clients in a cloud environment that is included in the targeted environment; and
wherein the method further comprises:
monitoring performance of the software program with respect to the first subset and the second subset simultaneously.

11. The method of claim 1, further comprising:
collecting a first subset of test results that are based on performance of the operations that impose the cumulative workload in response to each test result in the first subset indicating an error; and
not collecting a second subset of the test results in response to each test result in the second subset not indicating an error.

12. A system comprising:
determination logic configured to automatically determine a number of clients to be allocated in a targeted environment for participation in a test of a software program based on a specified cumulative workload;
allocation logic configured to automatically allocate the number of clients in the targeted environment, by deploying the software program on the number of clients, to perform operations that impose the cumulative workload against the targeted environment, each client of the number of clients imposing a respective proportion of the cumulative load against the targeted environment; and
execution logic configured to execute the test of the software program with respect to the number of clients such that each client of the number of clients simulates use of the software program by at least one user.

13. The system of claim 12, wherein the determination logic is configured to automatically determining a number clients to be allocated in the targeted environment for each of a plurality of modes of the test based on the specified cumulative workload;
wherein the allocation logic is configured to automatically allocate the respective number of clients in the targeted environment for each mode; and
wherein the execution logic is configured to execute the test in a first mode of the plurality of modes with respect to a first number of the clients and to execute the test in a second mode of the plurality of modes with respect to a second number of the clients, the second number being different from the first number.

14. The system of claim 12, wherein the determination logic is configured to automatically determine a number of clients to be allocated in the targeted environment for each of a plurality of modes of the test based on the specified cumulative workload;
wherein the allocation logic is configured to automatically allocate the respective number of clients in the targeted environment for each mode;
wherein the plurality of modes includes at least two of a functional mode, a performance mode, a stress mode, or a scalability mode;
wherein the test in the functional mode is configured to determine whether the software program generates an expected output;
wherein the test in the performance mode is configured to determine an amount of time that the software program takes to perform an operation upon receipt of an instruction to perform the operation;
wherein the test in the stress mode is configured to determine a capability of the software program to remain operational in response to an increasing load over a period of time; and
wherein the test in the scalability mode is configured to incrementally increase the cumulative workload and to determine, at each incremental increase, the number of the clients that are to be allocated in the targeted environment to perform the operations that impose the cumulative workload against the targeted environment.

15. The system of claim 12, further comprising:
aggregation logic configured to aggregate test results from each client into a respective file of a plurality of files, the aggregation logic further configured to aggregate the plurality of files into a database, the aggregation logic further configured to aggregate data that are included in the plurality of files into a memory to generate a report regarding performance of the software program during the test.

16. The system of claim 12, further comprising:
aggregation logic configured to automatically aggregate information regarding test results describing performance of the software program during the test from a report to provide aggregated information that identifies a plurality of failures; and
filtering logic configured to filter the aggregated information with respect to a plurality of common characteristics among the plurality of failures to determine whether a designated failure that occurs with respect to a specified client is included in the plurality of failures.

17. The system of claim 16, wherein the determination logic is further configured to determine whether a subset of the aggregated information that identifies a specified failure of the plurality of failures corresponds to a designated common characteristic of the plurality of common characteristics, which corresponds to the designated failure, to an extent that exceeds a threshold; and
wherein the determination logic is further configured to determine that the designated failure is included in the plurality of failures in response to a determination that the subset of the aggregated information that identifies the specified failure corresponds to the designated common characteristic to the extent that exceeds the threshold.

18. The system of claim 12, wherein the allocation logic is configured to automatically allocate a first subset of the number of clients in an on-premises environment that is included in the targeted environment;
wherein the allocation logic is configured to automatically allocate a second subset of the number of clients in a cloud environment that is included in the targeted environment; and
wherein the system further comprises:
monitoring logic configured to monitor performance of the software program with respect to the first subset and the second subset simultaneously.

19. A computer program product comprising a computer-readable medium having computer program logic recorded thereon for enabling a processor-based system to automatically allocate clients for testing a software program, the computer program logic comprising:
a first program logic module for enabling the processor-based system to automatically determine a number of clients to be allocated in a targeted environment for participation in a test of a software program based on a specified cumulative workload;
a second program logic module for enabling the processor-based system to automatically allocate the number of clients in the targeted environment, by deploying the software program on the number of clients, to perform operations that impose the cumulative workload against the targeted environment, each client of the number of clients imposing a respective proportion of the cumulative load against the targeted environment; and
a third program logic module for enabling the processor-based system to execute the test of the software program with respect to the number of clients such that each client of the number of clients simulates use of the software program by at least one user.

20. The computer program product of claim 19, wherein the first program logic module includes logic for enabling the processor-based system to automatically determine a number of clients to be allocated in the targeted environment for each of a plurality of modes of the test based on the specified cumulative workload;
wherein the second program logic module includes logic for enabling the processor-based system to automatically allocate the respective number of clients in the targeted environment for each mode;
wherein the plurality of modes includes at least two of a functional mode, a performance mode, a stress mode, or a scalability mode;
wherein the test in the functional mode is configured to determine whether the software program generates an expected output;
wherein the test in the performance mode is configured to determine an amount of time that the software program takes to perform an operation upon receipt of an instruction to perform the operation;
wherein the test in the stress mode is configured to determine a capability of the software program to remain operational in response to an increasing load over a period of time; and
wherein the test in the scalability mode is configured to incrementally increase the cumulative workload and to determine, at each incremental increase, the number of the clients that are to be allocated in the targeted environment to perform the operations that impose the cumulative workload against the targeted environment.

* * * * *